(12) United States Patent
Cosentino et al.

(10) Patent No.: US 11,615,122 B2
(45) Date of Patent: *Mar. 28, 2023

(54) SYSTEMS AND METHODS FOR LOCATING AND RECOVERING KEY POPULATIONS OF DESIRED DATA

(71) Applicant: Magnet Forensics Investco Inc., Waterloo (CA)

(72) Inventors: Nicholas Bruce Alexander Cosentino, Waterloo (CA); Tayfun Uzun, Waterloo (CA)

(73) Assignee: Magnet Forensics Investco Inc., Waterloo (CA)

( * ) Notice: Subject to any disclaimer, the term of this patent is extended or adjusted under 35 U.S.C. 154(b) by 275 days.

This patent is subject to a terminal disclaimer.

(21) Appl. No.: 16/552,175

(22) Filed: Aug. 27, 2019

(65) Prior Publication Data

US 2019/0384780 A1   Dec. 19, 2019

Related U.S. Application Data

(63) Continuation of application No. 15/280,286, filed on Sep. 29, 2016, now Pat. No. 10,437,862.

(60) Provisional application No. 62/234,065, filed on Sep. 29, 2015.

(51) Int. Cl.
| | | |
|---|---|---|
| *G06F 7/00* | (2006.01) | |
| *G06F 16/00* | (2019.01) | |
| *G06F 16/29* | (2019.01) | |
| *G06F 16/2455* | (2019.01) | |
| *G06F 16/583* | (2019.01) | |

(52) U.S. Cl.
CPC .......... *G06F 16/29* (2019.01); *G06F 16/2455* (2019.01); *G06F 16/5838* (2019.01)

(58) Field of Classification Search
None
See application file for complete search history.

(56) References Cited

U.S. PATENT DOCUMENTS

| | | |
|---|---|---|
| 6,330,567 B1 | 12/2001 | Chao |
| 7,461,090 B2 | 12/2008 | Blinn et al. |
| 7,496,559 B2 | 2/2009 | Gross et al. |
| 7,844,596 B2 | 11/2010 | Best et al. |
| 8,208,764 B2 | 6/2012 | Guckenberger |
| 8,316,008 B1 | 11/2012 | Kohli |
| 10,437,862 B1 | 10/2019 | Cosentino et al. |

(Continued)

*Primary Examiner* — Tuan A Pham
(74) *Attorney, Agent, or Firm* — Own Innovation; James W. Hinton

(57) ABSTRACT

A system and a method for locating populations of content-specific data portions. The method includes determining a current population of data portions to be searched based on at least one prioritization criterion; accessing the current population of data portions; examining at least one data portion of the current population of data portions and extracting content-specific data; comparing the content-specific data to at least one suspect criterion; determining whether the current population meets at least one population criterion by analyzing the content-specific data; determining at least one next population of data portions to be searched based on proximity to the current population; and determining the at least one next population of data portions to be searched based on the at least one prioritization criterion.

15 Claims, 7 Drawing Sheets

(56) References Cited

U.S. PATENT DOCUMENTS

| | | | |
|---|---|---|---|
| 2004/0267529 A1* | 12/2004 | Baker | G10L 15/197 |
| | | | 704/252 |
| 2008/0294694 A1* | 11/2008 | Maghfourian | G06F 16/748 |
| 2010/0322300 A1* | 12/2010 | Li | H04N 19/61 |
| | | | 382/162 |
| 2011/0191533 A1* | 8/2011 | Coulter | G06Q 10/00 |
| | | | 711/112 |
| 2011/0296440 A1* | 12/2011 | Launch | G06F 21/72 |
| | | | 719/326 |
| 2013/0080447 A1* | 3/2013 | Ramer | G06Q 30/02 |
| | | | 707/748 |
| 2014/0079297 A1 | 3/2014 | Tadayon et al. | |
| 2014/0177955 A1* | 6/2014 | Srinivasan | G06V 40/107 |
| | | | 382/165 |

\* cited by examiner

SYSTEMS AND METHODS FOR LOCATING AND RECOVERING KEY POPULATIONS OF DESIRED DATA

RELATED APPLICATIONS

This application is a continuation of U.S. patent application Ser. No. 15/280,286, filed Sep. 29, 2016, which claims the benefit of U.S. Provisional Patent Application Ser. No. 62/234,065, filed Sep. 29, 2015, the entire contents of which are hereby incorporated herein by reference.

FIELD

The present disclosure relates to the field of locating content-specific data stored on a data storage device, for example on a hard drive or a laptop.

INTRODUCTION

Data storage devices, such as hard drives or laptops, may contain data portions that have specific content. For example, the data portions may contain pornographic material. It may be desirable for a party to find key populations of such content-specific data portions in a short period of time.

SUMMARY

In one aspect, in at least one example embodiment described herein, there is provided a computer-implemented method for locating populations of content-specific data portions. In at least one embodiment, the method comprising determining a current population of data portions to be searched based on at least one prioritization criterion, the current population of data portions being located on at least one data storage device; accessing the current population of data portions; examining at least one data portion of the current population of data portions and extracting content-specific data; comparing the content-specific data to at least one suspect criterion; determining whether the current population meets at least one population criterion by analyzing the content-specific data; if it is determined that the current population meets the at least one population criterion, then determining at least one next population of data portions to be searched based on proximity to the current population; if it is determined that the current population does not meet the at least one population criterion, then determining the at least one next population of data portions to be searched based on the at least one prioritization criterion.

In some cases, the method further includes determining whether the current population of data portions comprises at least one content-specific data portion.

In some cases, the method further includes determining a prioritized queue of populations to be searched based on the at least one prioritization criterion.

In some cases, the method further includes determining a prioritized queue of populations to be searched based on the at least one prioritization criterion, a first population of the prioritized queue of populations having the closest match with the at least one prioritization criterion and the last population of the prioritized queue of populations having the least match with the at least one prioritization criterion.

In some cases, the current population is the first population of the prioritized queue of populations determined by comparing data of a plurality of locations of populations to at least one prioritization criterion, each location comprising one population.

In some cases, the data of the plurality of locations includes data on when each location from the plurality of locations has been accessed.

In some cases, determining the at least one next population based on the proximity to the current population further comprises determining the at least one next population located on the at least one data storage device within a user-defined child proximity radius.

In some cases, determining the next population based on the proximity to the current population further comprises determining at least one population which is adjacent to the current population.

In some cases, determining the next population based on the proximity to the current population further comprises analyzing historical data of a location of the current population and comparing it to historical data of a plurality of locations.

In some cases, the at least one prioritization criterion comprises at least one time period.

In some cases, the at least one population criterion comprises a percentage of skin tone pixels within the accessed and examined data portions of the current population.

In some cases, the at least one population criterion comprises a maximum number of data portions of the current population to be accessed and examined.

In some cases, the at least one population criterion comprises a maximum number of determined content-specific data portions in the current population.

In some cases, the content-specific data comprises a percentage of skin tone pixels.

In some cases, the method further comprises recovering the at least one content-specific data portion.

In some cases, the data portion is a data file.

In some cases, the data portion is a fragment of an unallocated space data.

In some cases, the data portion is a data chunk.

According to some other aspects, there is provided a computer-implemented method for locating content-specific data portions, the method comprising determining a prioritized queue of populations to be searched based on at least one prioritization criterion, a first population of the prioritized queue of populations having the closest match with the at least one prioritization criterion; accessing a first data portion of the first population; examining the first data portion to determine whether the first data portion includes content-specific data matching the at least one suspect criterion; if it is determined that the first data portion includes the content-specific data matching the at least one suspect criterion, then recovering the first data portion.

According to some other aspects, there is provided a system for locating content-specific data comprising at least one data storage device, having unidentified data stored therein; at least one processor operatively coupled to the at least one data storage device, the at least one processor configured to determine a current population of data portions to be searched based on at least one prioritization criterion, the current population of data portions being located on at least one data storage device; access the current population of data portions; examine at least one data portion of the current population of data portions and extracting content-specific data; compare the content-specific data to at least one suspect criterion; determine whether the current population meets at least one population criterion by analyzing the content-specific data; if it is determined that the current population meets the at least one population criterion, then determine at least one next population of data portions to be searched based on proximity to the current population; and if it is determined that the current population does not meet the at least one population criterion, then determine the at least one next population of data portions to be searched based on the at least one prioritization criterion.

DRAWINGS

For a better understanding of the various embodiments described herein, and to show more clearly how these various embodiments may be carried into effect, reference will be made, by way of example, to the accompanying drawings which show at least one example embodiment, and in which.

DESCRIPTION OF VARIOUS EMBODIMENTS

Figure 1:
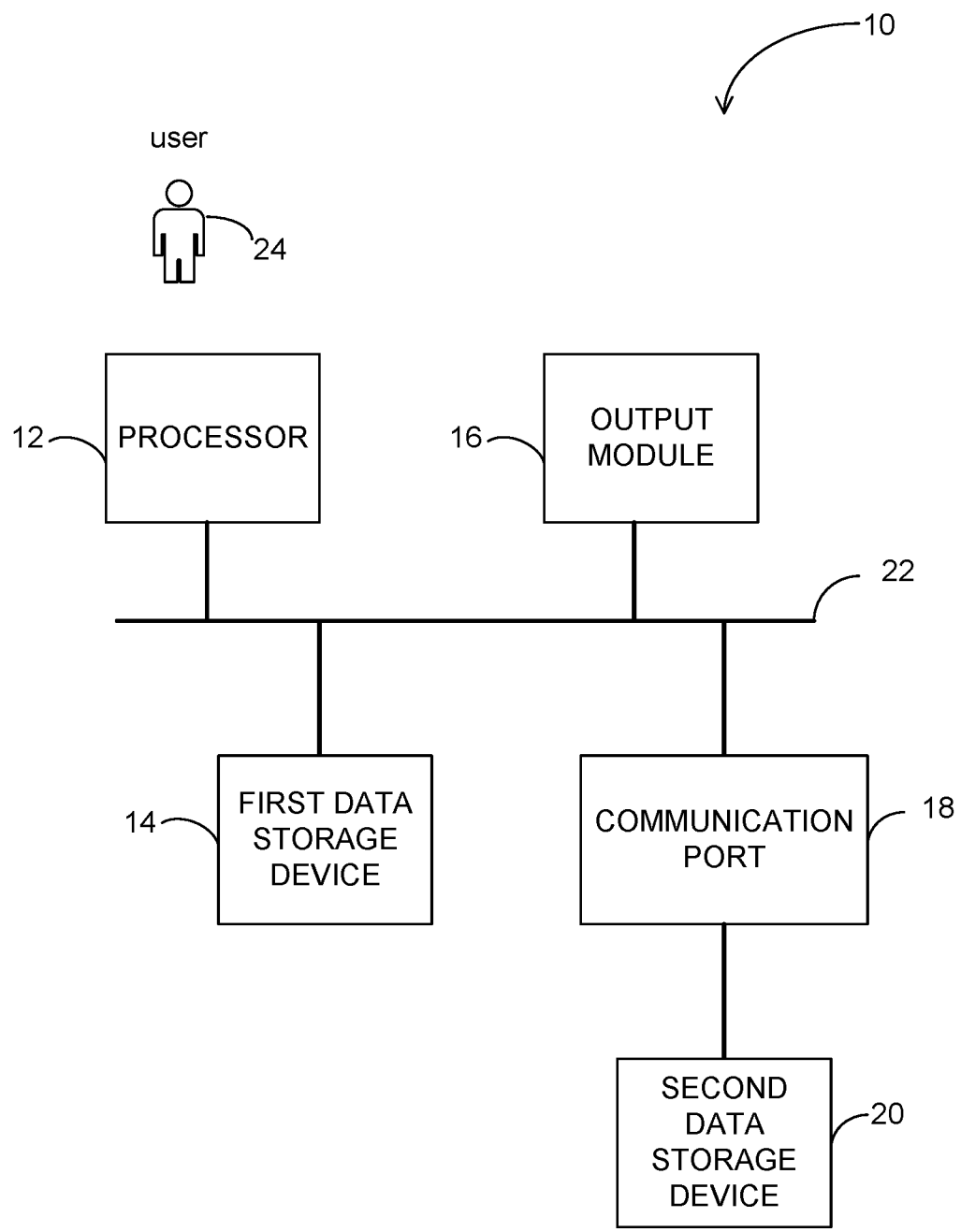
FIG. 1 is a schematic diagram illustrating a system for locating content-specific data, in accordance with at least one embodiment.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

The various embodiments of the systems and methods described herein may be implemented in hardware or software, or a combination of both. For example, some embodiments may be implemented in computer systems and computer programs, which may be stored on a physical computer readable medium, executable on programmable computers (e.g. computing devices and/or processing devices) each comprising at least one processor, a data storage system (including volatile and non-volatile memory and/or storage elements), at least one input device (e.g. a keyboard, mouse or touchscreen), and at least one output device (e.g. a display screen, a network, or a remote server). For example, and without limitation, the programmable computers may include servers, personal computers, laptops, tablets, personal data assistants (PDA), cell phones, smart phones, gaming devices, and other mobile devices. Program code can be applied to input data to perform the functions described herein and to generate output information. The output information can then be supplied to one or more output devices for outputting to one or more users.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

The terms "an embodiment", "embodiment", "embodiments", "the embodiment", "the embodiments", "one or more embodiments", "some embodiments" and "one embodiment" mean "one or more (but not all) embodiments of the present invention(s)" unless expressly specified otherwise.

The terms "including", "comprising" and variations thereof mean "including but not limited to", unless expressly specified otherwise. A listing of items does not imply that any or all of the items are mutually exclusive, unless expressly specified otherwise. The terms "a", "an" and "the" mean "one or more", unless expressly specified otherwise.

In addition, as used herein, the wording "and/or" is intended to represent an inclusive-or. That is, "X and/or Y"

is intended to mean X or Y or both, for example. As a further example, "X, Y, and/or Z" is intended to mean X or Y or Z or any combination thereof.

Referring now to FIG. 1, illustrated therein is a system 10 for locating a desired data, such as, for example, content-specific data portions, according to some embodiments. The system 10 includes a processor 12, a first data storage device 14, an output module 16, a communication port 18 and a second data storage device 20 coupled to the communication port 18. In this embodiment, the various components 12, 14, 16, 18 of the system 10 are operatively coupled using a system bus 22.

As used herein and in the claims, a "data portion" can include one or more of a data file, a data fragment, a data chunk, a data of unallocated space of a data storage device, a binary data at the sector level, a sector level data chunk, or any other form of data or information that can be stored on a data storage device.

The system 10 may be various electronic devices such as personal computers, networked computers, portable computers, portable electronic devices, personal digital assistants, laptops, desktops, mobile phones, smart phones, tablets, and so on.

In some examples, the first data storage device 14 may be a hard disk drive, a solid-state drive or any other form of suitable data storage device and/or memory that may be used in various electronic devices.

In at least one embodiment, the first data storage device 14 may have various content-specific data portions, hereafter "suspect data portions", which meet various specific criteria, hereafter "suspect criteria".

It may be desirable to locate as many as possible suspect data portions in the data storage device 14 in the shortest period of time. For example, a user 24 may use the processor 12 to locate the suspect data portions on the first data storage device 14. For example, the user 24 may be an investigator or a user of the data storage device 14.

For example, data at the first data storage device 14 may contain pornographic material. For example, a data portion with an image containing pornographic material may contain a higher than normal number of skin tone pixels in the image. For example, a data file may contain a higher than normal number of skin tone pixels in the image.

In at least one embodiment, in order to locate such data portion and identify as a "suspect data portion", a specific threshold of the number of skin tone pixels in one data portion may be used as a suspect criterion. In at least one embodiment, other criteria may be used to locate a data portion containing a pornographic image and identify it as a "suspect data portion". For example, specific data contained in a file's metadata, may be used to locate the file containing a pornographic image and identify it as a "suspect file".

The content-specific data portions may be saved or recorded on the storage device by one or more users of the first data storage device 14. The data portions with content-specific data may also be generated when a storage device user interacts with one or more applications. The content-specific data may be also downloaded when the storage device user is using various networks, such as, for example, internet or intranet. The content-specific data may also be installed without the storage device user's knowledge by various online social networks, email clients which may be located locally or accessed using an online interface, peer-to-peer file sharing applications, various web based applications such as social networks, websites, and so on.

In the embodiment as shown at FIG. 1, another data storage device, in addition to the first data storage device 14, namely the second data storage device 20, is provided. The second data storage device 20 may be used to store computer-executable instructions that can be executed by the processor 12 to configure the processor 12 to locate content-specific data portions in the data storage device 14.

It should be noted that it is not necessary to provide a second data storage device, and in other embodiments, the instructions may be stored in the first data storage device 14 or any other data storage device. However, it may be desirable for the instructions to be stored in a data storage device other than the first data storage device 14.

Referring still to FIG. 1, the processor 12 may be configured to provide a user interface to the output module 16. The output module 16, for example, may be a suitable display device (e.g. a monitor) coupled to the processor 12. The user interface allows the processor 12 to solicit input from the user 24 regarding various types of searches to be performed to locate the suspect data portions.

Figure 2:
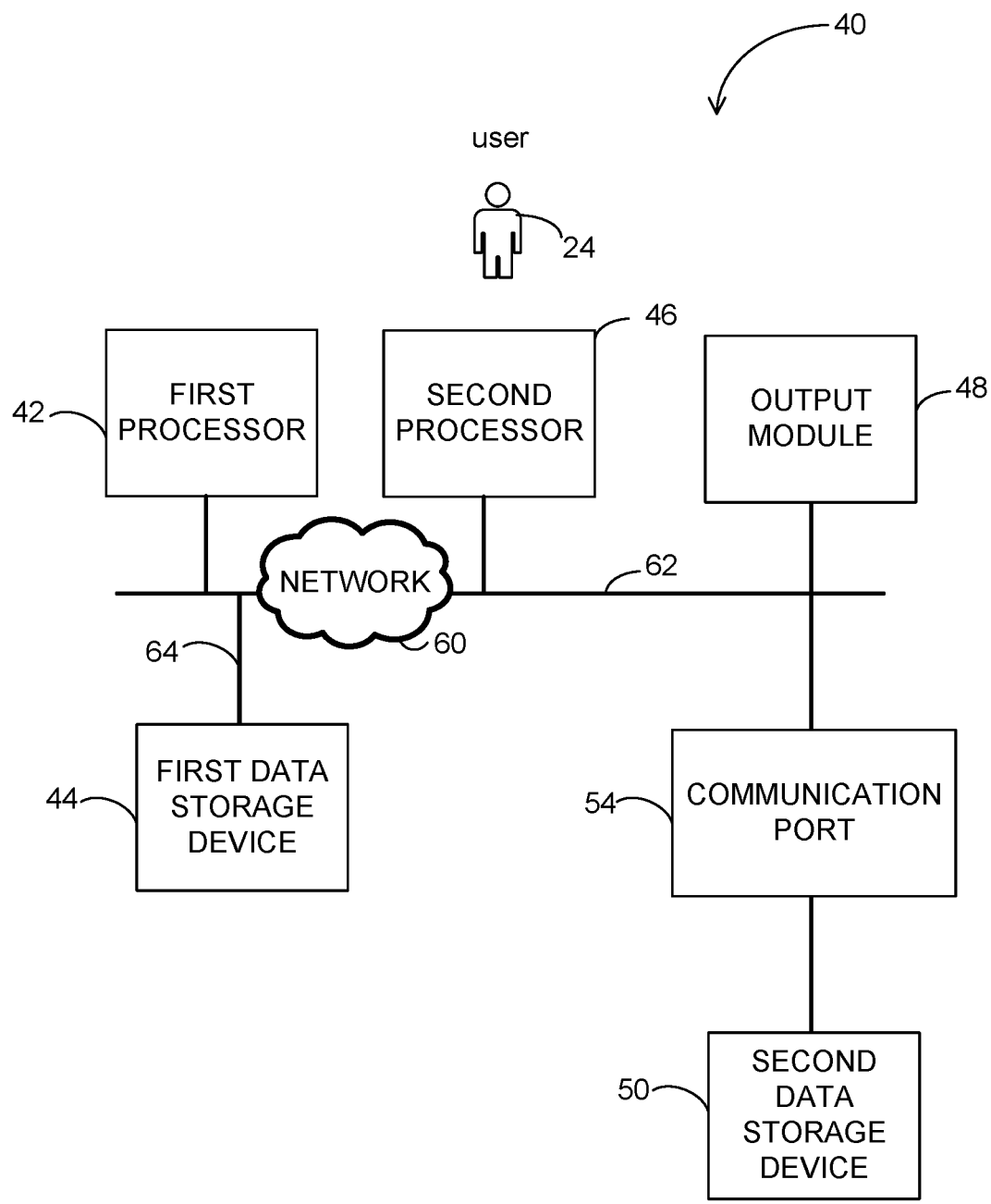
FIG. 2 is another schematic diagram illustrating a system for locating content-specific data, in accordance with at least one embodiment.

Referring now to FIG. 2, illustrated therein is a system 40 for locating content-specific data portions (desired data), according to some embodiments. The system 40 may include a first processor 42, a first data storage device 44, a second processor 46, an output module 48, a second data storage device 50, and a communication port 54. In this embodiment, the components 46, 48, 50, and 54 are operatively coupled to the network 60 using a system bus 62. The first processor 42 and the first data storage device 44 may be operatively coupled to the network 60 using a system bus 64.

For example, the user 24 may use the second processor 46 to access and search the first data storage device 44 via the network 60 in order to detect at least one suspect data portion. In at least one embodiment, the second data storage device 50 may store computer-executable instructions that can be executed by the second processor 46 and/or the first processor 42.

Figure 3:
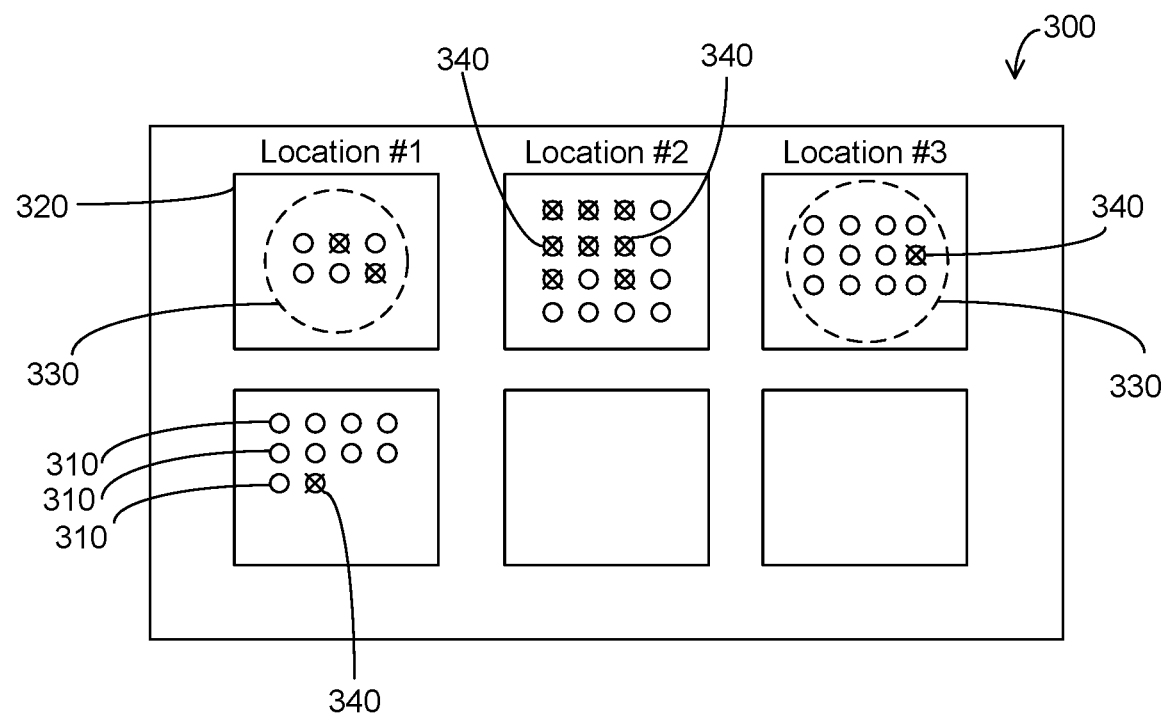
FIG. 3 is a schematic representation of a section of data stored at a data storage device, in accordance with at least one embodiment.

Referring now to FIG. 3, illustrated therein is a schematic representation of a section 300 of data stored at the first data storage device 14, according to some embodiments. The section 300 comprises a large amount of data portions 310. For example, the data portions 310 may be stored at various locations 320. For example, a location 320 may be a directory/folder or a group of directories/folders. Each location 320 may contain a population 330. Each population 330 may contain at least one data portion 310. In at least one embodiment, one or several data portions 310 may be suspect data portions 340.

In at least one embodiment, the data portions 310 may be data files. For example, at least one data file may be a suspect data file.

In at least one embodiment, the location 320 may be an unallocated space. In this example, the unallocated space may contain suspect data chunks. In at least one embodiment, a location 320 may contain data fragments. For example, one or more of the data fragments may be suspect data fragments.

In another example, a location 320 may contain two or more data portions. For example, the location 320 may contain data files and data fragments of unallocated data.

In at least one embodiment, one or several populations 330 may more likely have content-specific suspect data portions 340. For example, the user 24 may know that the content-specific data portions 340 and, therefore, at least one of the populations 330 may have been accessed recently or accessed within a certain period of time. For example, the user 24 may define one or more prioritization criteria that may help to identify populations 330 that are more likely to have content-specific data portions 340.

As used herein, and in the claims, the data and/or data portion and/or location and/or population being "accessed" can include one or more of being created, recorded, saved, modified, copied, used, accessed, or may include any other form of manipulation that can be performed with data.

In at least one embodiment, in order to find the suspect data portions 340 as fast as possible, the locations 320 and therefore the populations 330 that are more likely to include suspect data portions 340, may need to be accessed and examined first. Therefore, when there is more than one population 330 stored on the data storage device 14, the populations 330 of data portions 310 may be organized in a prioritized queue of populations 400.

Figure 4:
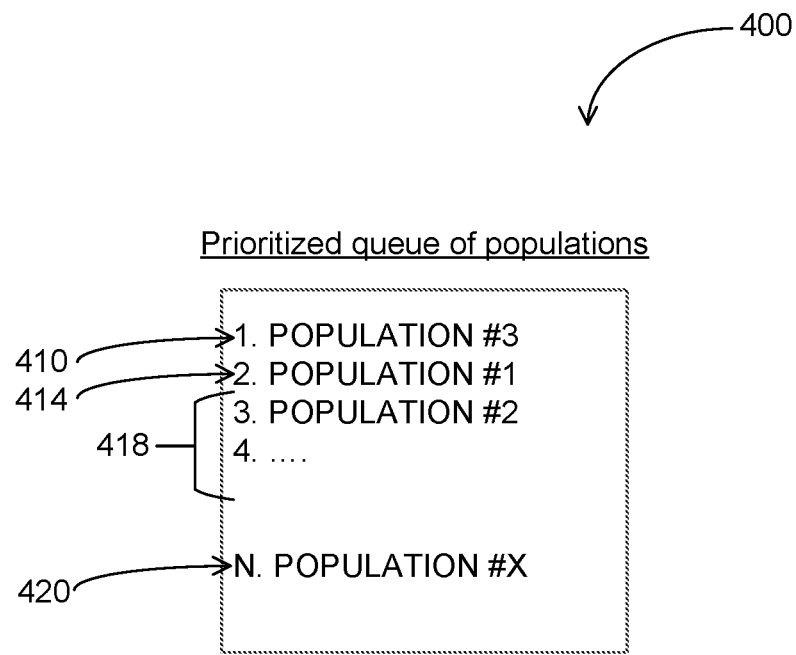
FIG. 4 is a schematic representation of a prioritized queue of populations, in accordance with at least one embodiment.

An exemplary embodiment of the prioritized queue of populations 400 is illustrated at FIG. 4. The prioritized queue of populations 400 may contain at least one population 330 stored in the first data storage device 14 or 44.

The prioritized queue of populations 400 may be determined based on prioritization criteria. For example, the user 24 may define one or more prioritization criteria using the user interface. For example, information, that may be included in historical data of the locations 320, may be identified as prioritization criteria. In at least one embodiment, historical data may include when, e.g. at what particular time and date, the location 320 has been accessed. In at least one embodiment, the prioritization criteria may include information on one or more time periods. The prioritization criteria may also specify what type of operation has been performed with the data portion 310. For example, the data portion 310 may have been accessed, used, created, modified, and/or saved. The prioritization criteria may also include other information that may help to establish priority in which the locations 320 (or populations 330) in the data storage device 14 or 44 should be searched.

In at least one embodiment, the location/population data, containing location information and historical data of the populations 330, may be extracted. The extracted data may be further compared with at least one prioritization criterion and analyzed in order to determine a prioritized queue of populations 400.

In at least one embodiment, the prioritized queue of populations 400 may be determined: the first population 410, the second population 414, other populations 418, and the last population 420.

In at least one embodiment, the prioritized queue of populations 400 may determine a priority in which the populations 330 have to be accessed in order to find the suspect data portions 340 in the shortest period of time. For example, a first population 410, being at the top level of the prioritized queue of populations 400 may be at highest risk to contain at least one suspect data portion 340. In at least one embodiment, this first population 410 may be a starting point or seed. The first population 410 may contain more than one data portion 310. A last population 420, which may be at the lowest level of the prioritized queue of populations 400, may be determined to have the lowest risk to contain the suspect data portions 340. Therefore, this last population 420 may be accessed after all other populations have been examined.

For example, the search may first start with the first population 410, which may more likely contain the suspect data portions 340. For example, the prioritized queue of populations 400 may determine initial search locations 320 which may be used as a seed or a starting point of the search.

In at least one embodiment, the user 24 may be prompted by the interface to manually enter one or more key locations 320 that may contain suspect data portions 340. In at least one embodiment, statistical knowledge of the locations 320 where the suspect data portions 340 may reside may help seeding the search.

It should be understood that although the prioritized queue of populations 400 may be determined, the first population 410 may in reality have less suspect data portions 340 than, for example, the last population 420. This fact, however, may remain unknown until the data portions 310 contained in the populations 330 have been accessed and examined using the suspect criteria.

Figure 5:
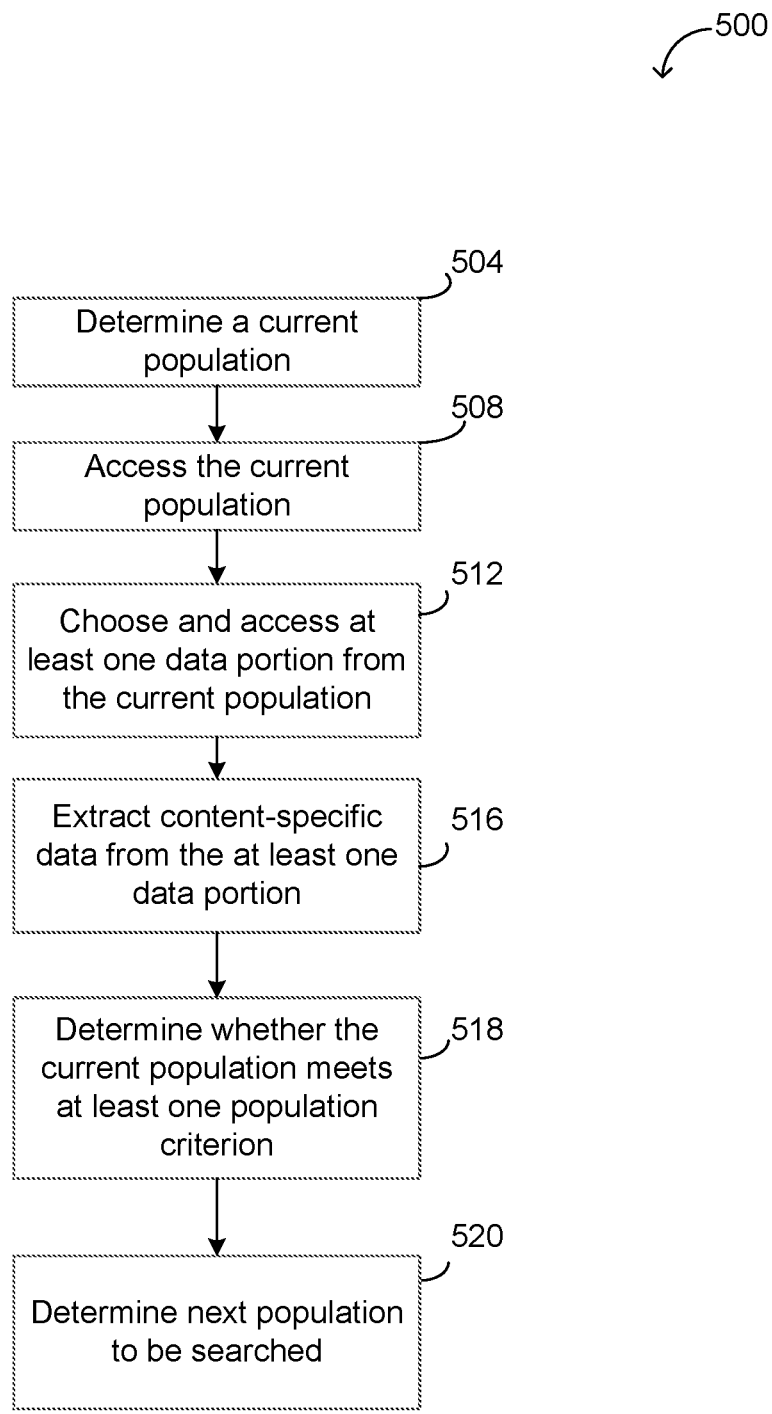
FIG. 5 is a flow chart illustrating a method for locating key populations of content-specific data portions, in accordance with at least one embodiment.

Referring now to FIG. 5, illustrated therein is a flow chart including one or more steps of a computer-implemented method 500 for locating key populations of content-specific data portions, according to at least one embodiment. In at least one embodiment, the method 500 starts with a step 504 wherein a current population may be determined based on one or more prioritization criteria.

For example, the current population may be the first population 410 of the prioritized queue of populations 400. As discussed above, the prioritized queue 400 may be determined based on at least one prioritization criterion. For example, the first population 410 of the prioritized queue of populations 400 may have the closest match with the at least one prioritization criterion and the last population 420 may have the least match with the at least one prioritization criterion.

At step 508, the current population may be accessed. At steps 512-516 the current population may be examined by extracting content-specific data of at least one data portion of the current population. The current population may be thus sampled. For example, the number of data portions 310 to be analyzed may be defined by the user 24.

In at least one embodiment, at step 512 one data portion, "a current data portion", of the current population may be chosen and accessed. In at least one embodiment, the current data portion may be the data portion that has not been examined previously. In at least one embodiment, the current data portion may be randomly chosen within the current population.

At step 516, the data contained in the current data portion may be extracted and compared to at least one suspect criterion. In at least one embodiment, when the data extracted from the current data portion matches at least one suspect criterion, the current data portion may be identified as a suspect data portion 340.

As described above, various suspect criteria may be defined by the user 24. For example, the user 24 may define a threshold of skin tone pixels to be contained in an image data portion 310 for this data portion to be considered a suspect data portion 340. In this example, if the current data portion contains more than a specified threshold number of skin tone pixels in the image, the examined and analyzed data portion may be identified as a suspect data portion 340 at step 516.

For example, the suspect data portion 340 may be located at a certain proximity to a particular data portion, the particular data portion and the parameters of the proximity being defined by the user 24.

For example, the user 24 may define specific data that may be contained in the metadata of the suspect file and/or in the header of the suspect file. For example, the suspect file may be located at a certain proximity to a particular file, the parameters of the proximity and the particular file being defined by the user 24.

In at least one embodiment, the user 24 may define a number of suspect criteria that the current data portion should match to be identified as a suspect data portion 340.

In another embodiment, the user 24 may define a certain combination of suspect criteria that have to match in order the current data portion to be identified as a suspect data portion 340.

At step 518, the method determines whether the current population meets at least one population criterion by analyzing the content-specific data extracted from at least one data portion 310. If it is determined that the current population meets the at least one population criterion, then the method at step 520 may determine at least one next population 330 of data portions 310 to be searched based on proximity to the current population. If it is determined that the current population does not meet the at least one population criterion, then the method at step 520 may determine the at least one next population of data portions 310 to be searched based on the at least one prioritization criterion.

Figure 6:
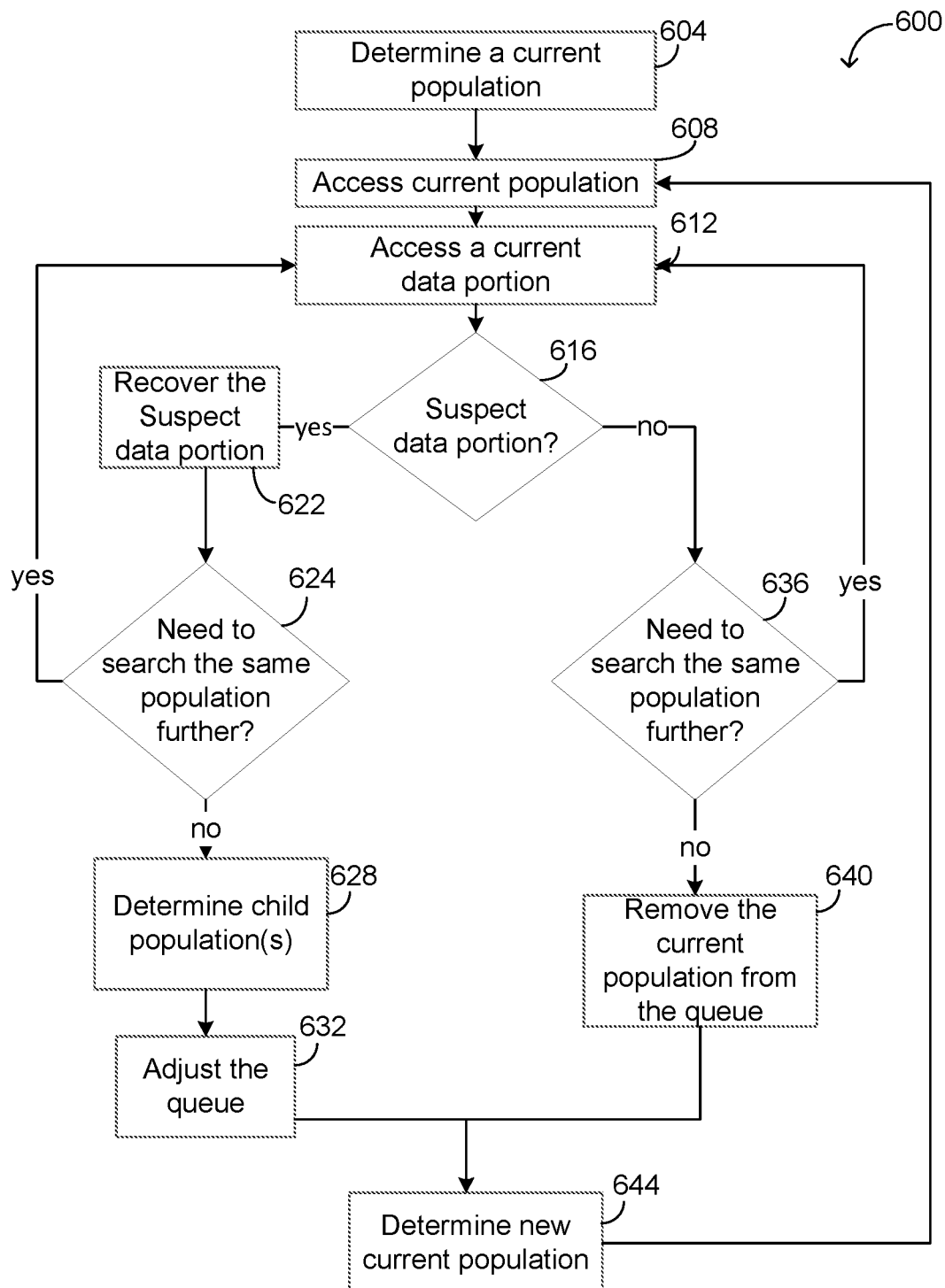
FIG. 6 is another flow chart illustrating a method for locating key populations of content-specific data portions, in accordance with at least one embodiment.

Referring now to FIG. 6, illustrated therein is a flow chart including one or more steps of a computer-implemented method 600 for locating key populations of content-specific data portions, according to at least one embodiment. Steps 604, 608, 612, and 616 are analogous to steps 504, 508, 512, and 516 at FIG. 5.

After the suspect data portion 340 has been identified at step 616, the data portion information may be presented to the user 24, the fact that the suspect data portion 340 has been found may be logged and/or the suspect data portion 340 may be copied to another location or to another storage device at step 622. For example, the suspect data portion 340 may be recovered and information about this suspect data portion 340 may be recorded at step 622.

The suspect data portion 340 may also need to be further examined by the user 24. For example, the interface may prompt the user 24 to provide an input at this time. For example, the user 24 may be prompted to provide a location where the suspect data portion 340 should be copied to or moved to. In another example, the suspect data portion 340 may also be deleted at step 622. For example, the user 24 may be prompted to authorize deleting the suspect data portion 340.

The information, such as the location where the suspect data portion 340 may be copied to and/or whether the suspect data portion 340 has to be deleted, may be defined using the inventor interface during initial set-up.

In at least one embodiment, at step 624, a determination is made whether the current population has to be further searched for suspect data portions 340. For example, the user 24 may have determined one or more specific population criteria. The population criteria may comprise various parameters. When the current population matches the population criteria, further search of suspect data portions 340 within the current population should be conducted.

For example, the population criterion may comprise a percentage of skin tone within the assessed and examined data portions 310 of the current population. For example, the user 24 may define that the percentage of the skin tone within the accessed and already examined data portions needs to be more than 30% in order to continue searching for suspect data portions 340 within the current population. Therefore, if only one data portion has been identified as a suspect data portion 340 so far, and the percentage of skin tone within this one data portion is more than 30%, then the method determines at step 624 that the current population has to be examined further and moves back to step 612 in order to access and examine another data portion 310 in the current population.

The user 24 may also define a maximum number of data portions 310 of the current population to be assessed and examined before the method may finish searching within this current population and start searching within the next population (for example, the second population 414) listed in the prioritized queue of populations 400. The user 24 may also define a maximum number of determined suspect data portions 340 in the current population, before the method may start searching within another population.

In at least one embodiment, the method may determine the maximum number of data portions 310 of the current population to be assessed and examined and/or the maximum number of determined suspect data portions 340 in the current population. The method may further adjust these numbers.

If it is determined, at step 624, that the current population does not match the population criteria and therefore the current population does not need to be further searched, the method at step 628 may define new populations that may need to be searched next, hereafter "child populations". In at least one embodiment, the child population may be determined based on child criteria. In at least one embodiment, the child criteria may be defined by the user 24 using the interface. In at least one embodiment, the user 24 may be prompted at step 628 to input child criteria.

For example, the child populations may be the populations that are located close to or at a certain distance from the current population. For example, the child criteria may define that the child populations may be all populations located in the same folder or directory as the current population.

In at least one embodiment, determining the at least one next population based on the proximity to the current population further may comprise determining the at least one next population located on the at least one data storage device within a user-defined child proximity radius.

For example, two populations 330 may be adjacent to each other if their locations are physically located within a certain distance from each other on the data storage device 14 (44). In this example, the user 24 may define a maximum distance between the child locations and/or a maximum distance between a location of the current population and a location of the child population.

In at least one embodiment, determining the next population based on the proximity to the current population may also comprise determining at least one population which is adjacent to the current population. For example, two populations may be adjacent to each other if they are in the same parent folder/directory. For example, two populations may be adjacent to each other if they are in the same grandparent folder/directory. For example, the user 24 may define at least one child criterion, which may specify whether a child population may be searched in a parent, grandparent, or a great-grandparent directory/folder.

In at least one embodiment, determining the next population based on the proximity to the current population may further comprise analyzing historical data of a location of the current population and comparing it to historical data of a plurality of locations. For example, historical data may include time and date when the location of the current population has been accessed.

In at least one embodiment, the child criteria may include time periods during which one or more suspect data portions 340 may have been recorded and/or accessed. For example, the at least one child criterion may define the child populations as that the populations that have been accessed at the same time as the current population, or within a certain time period before and/or after the current population has been accessed.

In at least one embodiment, the child population may be determined based on a number of suspect data portions 340 determined in the current population.

In at least one embodiment, after the child populations have been determined at step 628, the method may adjust the prioritized queue of populations 400 to be searched at step 632. In at least one embodiment, the child populations defined at step 628 may replace the first population in the queue (current population) that has just been searched for a suspect data portion 340 at steps 612 and 616.

In at least one embodiment, for example, if no child locations were determined, the current population may be removed from the queue of populations 400. In this case, the second population of the prioritized queue of populations 400 (for example, the second population 414 at FIG. 4) may become the current population.

After the queue 400 has been updated, the method may return to step 608 in order to access and examine the updated current population.

Referring again to FIG. 6, if the data portion has been determined as not being the suspect data portion 340 at step 616, the method proceeds to step 636, where it is determined whether the current population has to be searched further, based on the at least one population criterion.

At step 640, the current population (for example, the first population 410) may be removed from the prioritized queue 400 and therefore the prioritized queue 400 may become updated. The new first population 410 in the updated prioritized queue 400 may be examined next at step 608.

In at least one embodiment, the prioritized queue of populations 400 may be determined at the start of the methods 500 and 600. For example, the user 24 may define a number of the population locations 320 of the queue 400. For example, the user 24 may define that the queue 400 may contain only top 10 populations. Therefore, the queue 400 may use the prioritization criteria to define only first 10 populations that may more likely contain suspect data portions 340. As it is described above, the prioritized queue 400 may be updated/adjusted after the current population has been searched and the suspect data portions 340 have been identified in that current population.

In at least one another embodiment, the methods 500 and 600 may first determine only one current population using the prioritization criteria. In this example, the population to be analyzed next may be determined right after the current population has been analyzed. After this current population has been analyzed, the next population to be searched may be determined using the prioritization criteria and/or child criteria.

For example, if the suspect data portion 340 has been determined at step 616, and it has been determined at step 624 that the current population does not need to be searched further, one or more child populations may be determined at step 628 and one of these child populations may be determined as the next population to be searched. As discussed above, the child populations may be determined based on proximity to the current population.

If, at step 616 it has been determined that current data portion is not a suspect data portion 340, and it has been determined at step 636 that the current population does not need to be searched further, the next population may be determined using the prioritization criteria.

Figure 7:
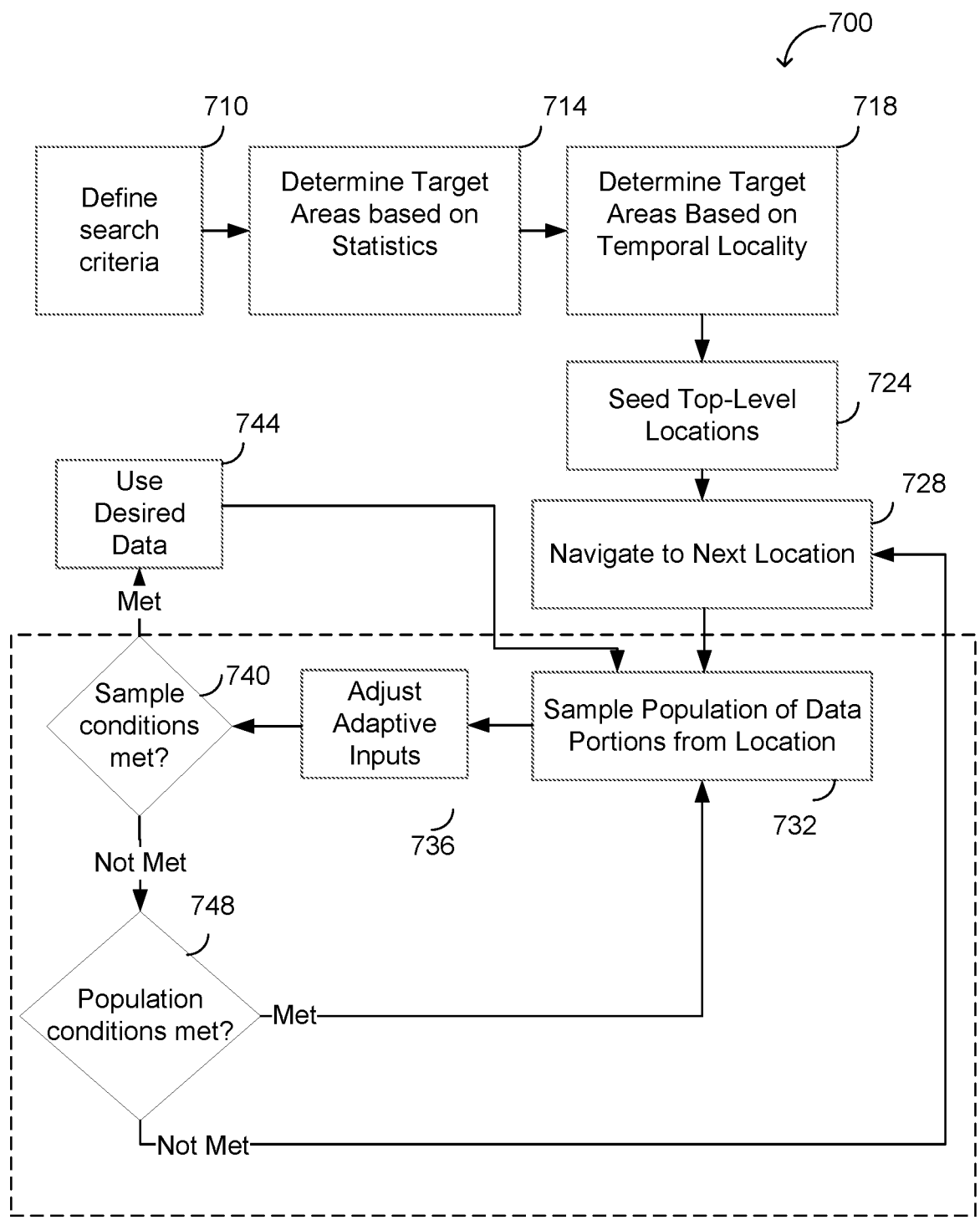
FIG. 7 is another flow chart illustrating a method for locating key populations of content-specific data portions, in accordance with at least one embodiment.

Referring now to FIG. 7, illustrated therein is a flow chart including one or more steps of a computer-implemented method 700 for locating key populations of content-specific data portions 340, in accordance with at least one embodiment.

Various search criteria may be provided by the user 24 in order to locate and recover key populations of content-specific data. For example, the search criteria may include the at least one suspect criterion, the at least one prioritization criterion, the at least one population criterion, and the at least one child criterion. In at least one embodiment, the search criteria may be defined by the user 24 using the user interface.

At step 710, the suspect criteria are defined by the user 24. As described above, the suspect criteria may include certain data to be found in proximity of a particular data portion 310. For example, the suspect criteria may include certain data to be found at the file header. For example, the suspect criteria may include proximity to a particular file or to other type of data portion 310, e.g., data fragment. For example, other search criteria may also be defined at step 710.

At step 714, first target areas (for example, locations 320) of the data storage device are determined based on statistical knowledge on where the suspect data portions 340 may reside. At step 718, second target areas are determined by comparing data on when the locations have been accessed. For example, the second target areas may include the most recently used or accessed data portions 310 and/or folders. For example, the second target areas may be the locations that were used or accessed around a certain time period. At step 724, the top-level locations that may have suspect data portions 340 are determined based on the results obtained at steps 718 and 724.

At step 728, the current location is determined and accessed. At step 732, the current population of data portions located at the current location is sampled. In at least one embodiment, one data portion 310 is chosen from the current population of data portions.

At step 736, the input thresholds may be adjusted. For example, the number of suspect data portions 340 to be determined in one population may be adjusted. For example, the thresholds may be adjusted based on the data extracted from the current data portion.

At step 740, the method 700 may determine whether the data extracted from the current data portion meets the at least one suspect criterion. If the suspect criteria are met, the method uses the desired data at step 744. In another example, if one suspect criterion is met, the method uses the desired data at step 744. For example, the information, that the suspect data portion 340 has been found, may be logged in, the suspect data portion 340 may be copied, or other information about the suspect data portion 340 may be recorded at this step.

If the suspect conditions have not been met at step 740, at step 748 the method determines whether the at least one population criterion is met. If the at least one population criterion is met or a certain number of the population criteria are met, then the method may proceed to further sampling the current population at step 732. Another data portion 310 of the current population may be chosen at step 732.

If it is determined that the at least one population criterion is not met, the method may proceed to choosing a new current population. For example, if the population criteria are met, or at least one population criterion is met, the search will continue recursively in child locations of the current population. For example, the child locations may be determined as described above. If the population criteria are not met, or at least one population criterion is not met, the search will abandon the current population and move on to the next population of the prioritized queue 400.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A computer-implemented method for investigating at least one data storage device to locate suspect data portions on the at least one data storage device, the method comprising:
   determining, at a processor, a prioritized queue of populations of data to be searched for the suspect data portions on the at least one data storage device, the prioritized queue of populations determined based on at least one prioritization criterion, a first population of the prioritized queue of populations having the closest match with the at least one prioritization criterion, the first population being located on the at least one data storage device;
   accessing, at the processor, a first data portion of the first population on the at least one data storage device;
   examining, at the processor, the first data portion to determine whether the first data portion includes content-specific data matching at least one suspect criterion, the at least one suspect criterion including a threshold of skin tone pixels, and the examining including determining whether the first data portion meets the threshold of skin tone pixels; and
   if it is determined that the first data portion includes the content-specific data matching the at least one suspect criterion, then;
      identifying, via the processor, the first data portion as a suspect data portion; and
      recovering, via the processor, the first data portion at the at least one data storage device.

2. The method of claim 1, wherein the method further comprises determining, at the processor, whether the first population meets at least one population criterion;
   if it is determined that the first population meets the at least one population criterion, then
   accessing and examining, at the processor, the at least one second data portion to determine whether the at least one second data portion includes data matching the at least one suspect criterion; and
   if it is determined that the first population does not meet the at least one population criterion, then
   removing, at the processor, the first location population from the prioritized queue of location populations.

3. The method of claim 1, wherein the method further comprises
   Determining, at the processor, at least one child population based on proximity to the first population and
   Replacing, at the processor, the first population of the prioritized queue of populations with the at least one child population.

4. The method of claim 1, wherein the threshold of skin pixels comprises a percentage of skin tone pixels.

5. The method of claim 2, wherein the population criterion comprises a percentage of skin tone pixels within the accessed and examined data portions of the first population.

6. The method of claim 2, wherein the population criterion comprises a maximum number of data portions of the first population to be accessed and examined.

7. The method of claim 2, wherein the population criterion comprises a maximum number of determined suspect data portions in the first population.

8. The method of claim 3, wherein determining the child population is based on whether the first data portion includes content-specific data matching the at least one suspect criterion.

9. The method of claim 3, wherein determining the child population is based on a location proximity to the suspect data portion.

10. The method of claim 1, further comprising
    providing at least one user-selectable option to select a maximum number of data portions to be accessed and examined in the first population;
    after the maximum number of data portions have been accessed and examined, removing, at the processor, the first population from the prioritized queue.

11. The method of claim 1, wherein the at least one prioritization criterion comprises at least one time period.

12. The method of claim 1, wherein the data portion is a data file.

13. The method of claim 1, wherein the data portion is a fragment of an unallocated space data.

14. The method of claim 1, wherein the data portion is a data chunk.

15. A non-transitory computer-readable medium storing computer program instructions, the instructions executable by a processor to perform a method of investigating at least one data storage device to locate suspect data portions portions on the at least one data storage device, the method comprising:
    determining, at a processor, a prioritized queue of populations of data to be searched for the suspect data portions on at least one data storage device, the prioritized queue of populations determined based on at least one prioritization criterion, a first population of the prioritized queue of populations having the closest match with the at least one prioritization criterion, the first population being located on the at least one data storage device;
    accessing, at the processor, a first data portion of the first population on the at least one data storage device;
    examining, at the processor, the first data portion to determine whether the first data portion includes content-specific data matching at least one suspect criterion, the at least one suspect criterion including a threshold of skin tone pixels, and the examining including determining whether the first data portion meets the threshold of skin tone pixels; and
    if it is determined that the first data portion includes the content-specific data matching the at least one suspect criterion, then:
       identifying, via the processor, the first data portion as a suspect data portion; and
       recovering, via the processor, the first data portion at the at least one data storage device.

* * * * *